United States Patent [19]

Sorensen et al.

[11] Patent Number: 5,022,137

[45] Date of Patent: Jun. 11, 1991

[54] METHOD OF OPERATING A QUICK-ACTION BAR CLAMP

[75] Inventors: Joseph A. Sorensen; Dwight L. Gatzemeyer, both of Lincoln, Nebr.

[73] Assignee: Petersen Manufacturing Co., Inc.

[21] Appl. No.: 450,837

[22] Filed: Dec. 14, 1989

Related U.S. Application Data

[62] Division of Ser. No. 234,173, Aug. 19, 1988, Pat. No. 4,926,722.

[51] Int. Cl.[5] ...................... B23Q 5/34

[52] U.S. Cl. ...................... 29/559; 29/468

[58] Field of Search ................ 29/256, 258, 259, 260, 29/261, 266, 270, 559, 757, 758, 759, 760, 467, 468; 81/126, 487; 269/6, 165, 166, 167, 169, 170

[56] References Cited

U.S. PATENT DOCUMENTS 3,096,975 7/1963 Irwin ........................ 269/169
4,874,155 10/1989 Goul ........................ 269/6

FOREIGN PATENT DOCUMENTS 2178689 2/1987 United Kingdom .
2204264 11/1988 United Kingdom .

*Primary Examiner*—Joseph M. Gorski
*Assistant Examiner*—Peter Dungba Vo
*Attorney, Agent, or Firm*—Lackenbach, Siegel, Marzullo & Aronson

[57] ABSTRACT

A bar clamp, which is operable with one hand, includes a fixed jaw and a movable jaw. The movable jaw connects at one end to a movable slide bar. One-way drive means, by operation of a trigger handle grip, releasably engages the slide bar and advances the movable jaw toward the fixed jaw. Return motion of the movable jaw is accomplished manually when the one-way drive means is disengaged. A braking lever, biased to bind against the slide bar, prevents reverse motion of the movable jaw except when disengaged from the slide bar. The trigger handle advances the slide bar by driving a second lever which binds against a slide bar surface. The second lever returns by spring force to its original position after each stroke of the trigger handle.

11 Claims, 3 Drawing Sheets

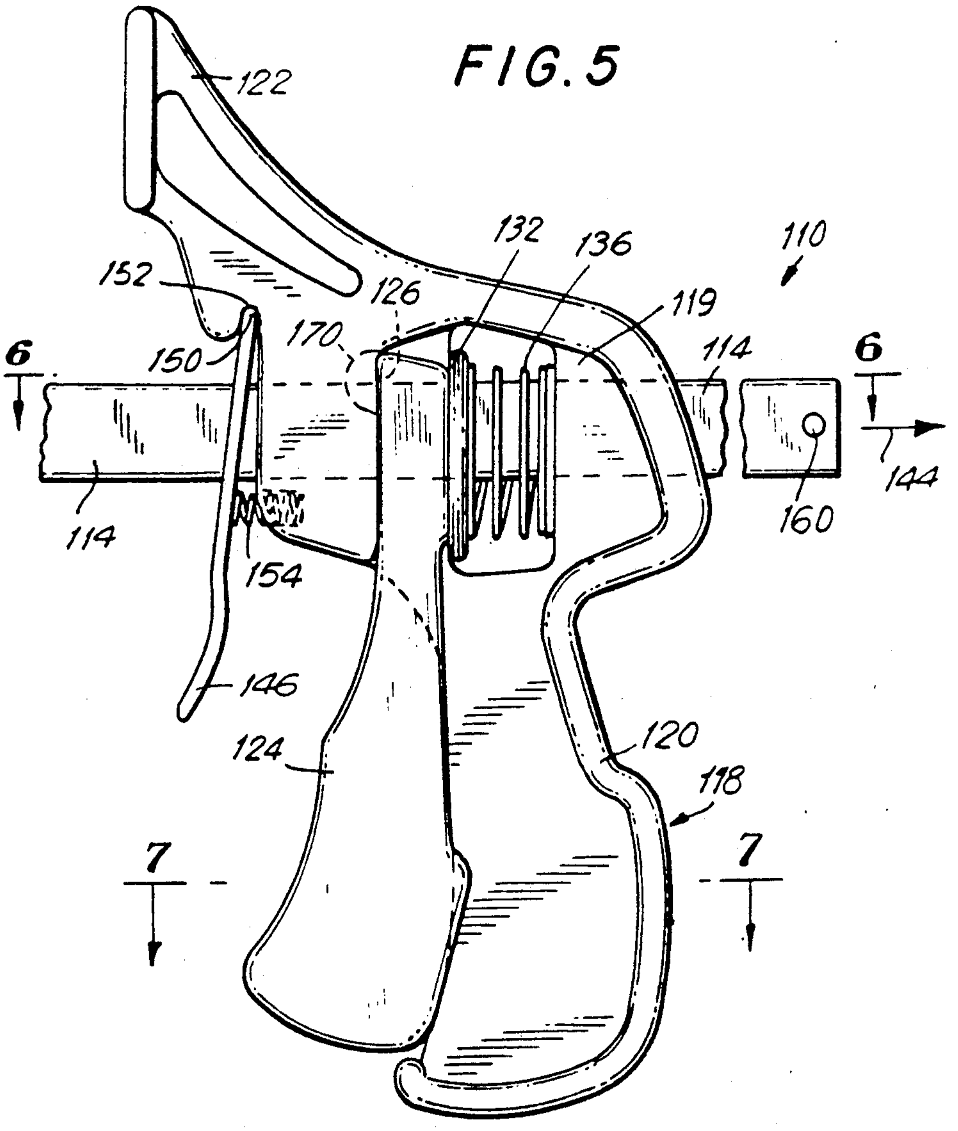
FIG. 5
FIG. 6
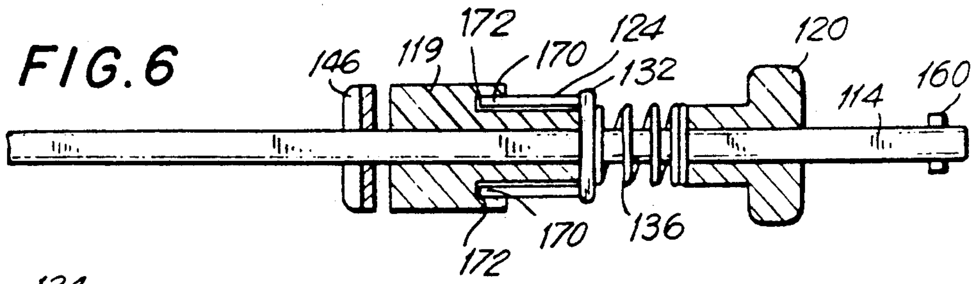
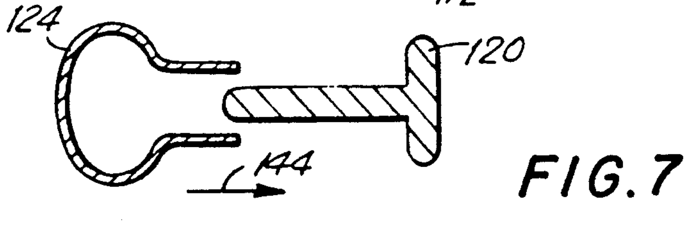
FIG. 7

METHOD OF OPERATING A QUICK-ACTION BAR CLAMP

This is a division of application Ser. No. 234,173 filed Aug. 19, 1988 now U.S. Pat. No. 4,926,722.

BACKGROUND OF THE INVENTION

This invention relates generally to a bar clamp of the type used to temporarily clamp together two articles, for example, for gluing, or to hold a workpiece for welding, and more particularly to a quick-action bar clamp wherein the moving jaw can be rapidly advanced or advances in small increments of selectable length. The concept of a bar clamp is old and well-known. In recent years, over-center toggle action handgrips have been incorporated for use in final tightening against the workpiece, for example, in U.S. Pat. Nos. 4,088,313 by Pearson and 4,563,921 by Wallace. A disadvantage in the prior art lies in the fact that adjustment in the moving jaw over a substantial distance is cumbersome and imprecise. Frequently, the moving jaw is entirely disengaged and free to move until the final tightening of an object between the movable and fixed jaws is accomplished. A third hand would be helpful.

What is needed is a bar clamp having a moving jaw which is rapidly movable over both short and long distances to clamp against a workpiece and is operable using one hand with complete control by the operator at all times.

SUMMARY OF THE INVENTION

Generally speaking, in accordance with the invention, a bar clamp especially suitable for rapid and precise closure against a workpiece is provided. The clamp includes a fixed jaw and a movable jaw opposing the fixed jaw. The movable jaw connects at one end to a slide bar which is movable to bring the movable jaw toward and away from the fixed jaw. One-way drive means, by operation of a trigger handle grip, releasably engages the slide bar and advances the movable jaw toward the fixed jaw. The one-way drive means is incapable of moving the slide bar and movable jaw away from the fixed jaw. Return motion of the movable jaw is accomplished manually when the one-way drive means is disengaged. A first braking lever which is biased to bind against the slide bar prevents reverse motion of the movable jaw away from the fixed jaw, except when the first lever is disengaged from the slide bar. Thus, for return motion of the jaw, it is necessary that both the one-way drive means and the first braking lever be disengaged. The trigger handle advances the slide bar by driving a second lever which binds against a surface of the slide bar and moves the rod as the second lever moves toward the fixed jaw. The second lever is returned by spring force to its original position after each stroke of the trigger handle, the second lever sliding over the bar surface during its return motion.

Accordingly, it is an object of this invention to provide an improved quick-action bar clamp wherein the moving jaw may be moved over short and long distances rapidly.

Another object of this invention is to provide an improved quick-action bar clamp, wherein the moving jaw may be incrementally and precisely advanced from any position.

A further object of this invention is to provide an improved quick-action bar clamp wherein the moving jaw may be advanced in increments of selectable length for each action of a driving handle.

Yet another object of this invention is to provide an improved quick-action bar clamp wherein the movable jaw does not move of its weight when the clamp is in a vertical position.

Still another object of this invention is to provide an improved quick-action bar clamp wherein clamp operation is accomplished with one hand.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a view similar to FIG. 1 of an alternative embodiment of a quick-action bar clamp in accordance with the invention;

FIG. 6 is a sectional view taken along the line 6—6 of FIG. 5; and

FIG. 7 is a sectional view taken along the line 7—7 of FIG. 5.

DESCRIPTION OF THE PREFERRED EMBODIMENT

Figure 1:
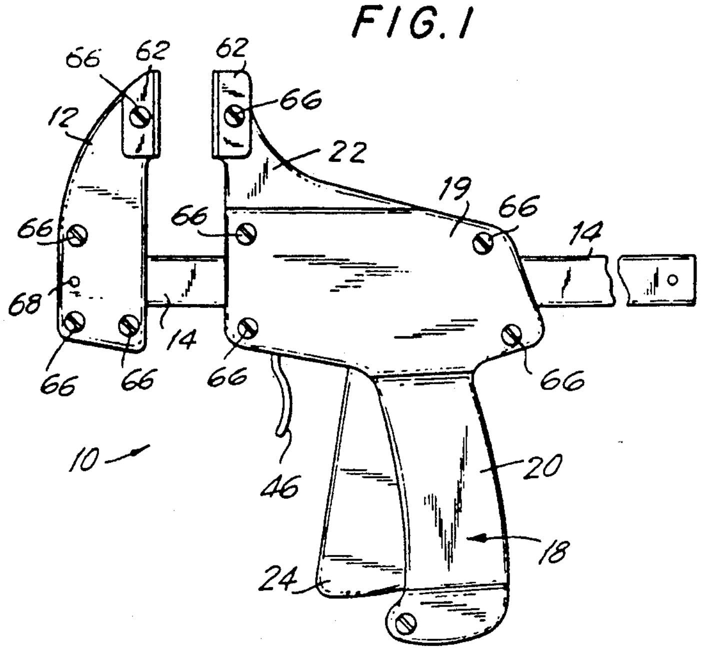
FIG. 1 is a front view of the quick-action bar clamp in accordance with the invention.

With reference to the Figures, a quick-acting bar clamp 10 includes a movable jaw 12 connected to a slide bar 14. The slide bar is slidably supported in a slot 16 (FIG. 4) which passes through a handle/grip assembly 18.

The handle/grip assembly 18 includes a body 19 through which the slot 16 passes, a handgrip 20 attached to the body 19 on one side of the slot 16, and a fixed jaw 22 attached to the body 19 on the other side of the slot 16. A trigger handle 24 is pivotably mounted to the body 19 adjacent the slot 16 by means of a pivot pin 26. The moving jaw 12 opposes the fixed jaw 22.

Figure 4:
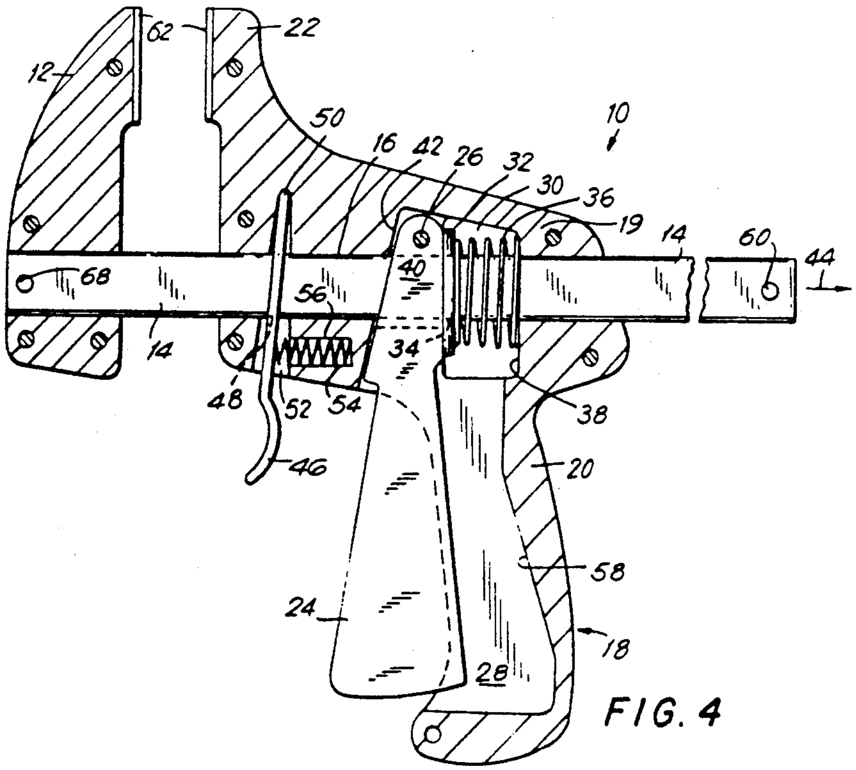
FIG. 4 is a sectional view to an enlarged scale taken along the line 4—4 of FIG. 3.

As best illustrated in FIG. 4, the handle grip 20 is hollow in part so as to receive the trigger handle in the cavity 28. A second cavity 30 in the body 19 divides the bore 16. A driving lever 32 is suspended on the slide bar 14 which passes through a hole 34 in the driving lever 32. A spring 36 is compressed between the driving lever 32 and a surface 38 of the cavity 30 urging the driving lever 32 against the upper end 40 of the trigger handle 24. The upper end 40 of the trigger handle 24 is forked and straddles the slide bar 14. Force of the spring 36 urges the trigger handle 24 against an inner surface 42 of the body 19 thus providing a standby condition. In the standby condition, the driving lever 32 is positioned perpendicular to the direction of motion, indicated by the arrow 44, of the slide bar 14 when in operation. Any motion of the handle 24 about the pivot pin 26 in the direction of the arrow 44 is accomplished against the bias of the spring 36.

A braking lever 46 is suspended from the slide bar 14 which passes through an opening 48 in the braking lever 46. One end 50 of the braking lever 46 is pivotably captured in a recess 52 within the body 19 such that the braking lever 46 may pivot within constraints defined by the surfaces of the recess 52 and by binding of the braking lever 46 with the slide bar 14 when the edges of the opening 48 in the lever 46 engage the surface of the slide rod 14. A spring 54 seats in a recess 56 in the body 19 and biases the free end of the braking lever 46 away from the trigger handle 24. The biased position of the braking lever 46 is limited by the binding interference between the opening 48 of the lever 46 with the slide bar 14.

It should be noted that in the standby position illustrated in FIG. 4, the driving lever 32 is substantially perpendicular to the longitudinal axis of the slide bar 14, whereas the portion of the braking lever 46 which engages the slide bar 14 is transverse to the longitudinal axis of the bar 14 but not perpendicular thereto. In this condition, if a force is applied to the moving jaw 12 in the direction indicated by the arrow 44, the slide bar 14 is free to move through the hole 34 in the driving lever 32 and through the spring 36. Because the braking lever 46 is free to pivot against the bias of the spring 54 when force is applied on the moving jaw 12 in the direction of the arrow 44, the braking lever 46 presents no obstacle to this motion of the slide bar and the moving jaw 12 may be advanced continuously toward the fixed jaw 22.

However, in the standby position as illustrated in FIG. 4, if a force is applied to the movable jaw 12 in the direction opposite to the direction indicated by the arrow 44, the edges of the opening 48 in the lever 46 bind against the surface of the slide bar 14 and it is not possible, without further action, to withdraw the moving jaw farther away from the fixed jaw 22, as described more fully hereinafter. Compression of the spring 56 by pressing on the braking lever 46 in the direction of the arrow 44, allows withdrawal of the slide bar 14 and movable jaw 12 away from the fixed jaw 22. This force brings the end 50 of the lever 46 into perpendicularity with the direction of intended motion of the slide bar 14. Then the slide bar 14 is free to slide in either direction through the opening 48 in the braking lever 46.

The trigger handle 24 is squeezed in the direction indicated by the arrow 44 to incrementally advance the slide bar 14 with its attached movable jaw 12 toward the fixed jaw 22. When the handle 24 is squeezed between a user's hand (not shown) and the handgrip 20, pivoting occurs about the pivot pin 26 and the end 40 of the trigger handle 24 moves in the direction of the arrow 44. This causes the driving lever 32 to pivot about its upper end (FIG. 4), so that the driving lever 32 is no longer perpendicular to the direction 44 of intended motion of the slide bar 14. Pivoting the driving lever 32 compresses the spring 36 and also causes the edges of the hole 34 through the driving lever 32 to bind against the surface of the slide rod 14. Binding occurs because the driving lever 32 is no longer perpendicular to the direction 44 of intended motion of the slide bar 14. Further motion of the trigger handle 24 causes the driving lever 32 to translate in the direction of the arrow 44. This motion further compresses the spring 36 and in the process, by means of the binding interference between the lever 32 and bar 14, advances the bar 14 and its connected movable jaw 12 toward the fixed jaw 22. The maximum distance of advance of the movable jaw 12 with one stroke of the trigger handle 22 is limited when the spring 36 is fully compressed or, in an alternative construction, the handle 24 strikes the inner surface 58 of the handgrip 20.

However, the stroke of the trigger handle 24 can be through any lesser arc, thereby diminishing the distance the movable jaw 12 travels in a single stroke in proportion to the angle of the trigger handle stroke. Additional strokes may be applied to the trigger handle 42 of any magnitude until the jaws 12, 22 come together, or a workpiece (not shown) is firmly gripped between them.

After the trigger handle 24 is fully pivoted in the direction of the arrow 44 about the pivot pin 26, release of the trigger handle 24 causes the return of the trigger handle 24, driving lever 32 and spring 36 to the position shown in FIG. 4 as a result of the compressive forces in the spring 36 urging the components toward the movable jaw 12.

A transverse pin 60 passing through the free end of the slide bar 14 prevents withdrawal of the slide bar 14 from the slot 16 when the braking lever 46 is pressed in the direction of the arrow 44 and the movable jaw 12 is manually drawn away from the fixed jaw 22. It should be noted that operation of the trigger handle 24 is ineffective in accomplishing any motion of the slide bar 14 in the direction opposite to the arrow 44.

For illustrative purposes only, protective pads 62 are shown attached to the jaws 12, 22. Also for illustrative purposes, the moving jaw 12 and the handle/grip assembly 18 are formed of halves which are held together by screws 66. The moving jaw 12 is held to the slide bar 14 by a pin 68. In the illustrated embodiment (FIG. 4) in accordance with the invention, the slide bar 14 has a rectangular cross-section. In alternative embodiments in accordance with the invention, the slide bar 14 may be any shape, for examples, square, round, triangular, and the openings 34, 48 in the levers 32, 46, respectively are appropriately shaped for proper binding interference with the slide bar 14.

In summary, if it is considered that a workpiece is to be clamped between the jaws 12, 22, the movable jaw 12 can be advanced toward the fixed jaw 26 either in one continuous motion, merely by pushing in the direction of the arrow 44 on the movable jaw 22 or, by operating the trigger handle 24 in a series of strokes of length to be determined by the user. Large strokes may be used at first and small strokes later as the desired pressure is applied to the workpiece. During this advancing operation, the braking lever 46 prevents any backward motion of the slide bar 14 after each advance has been completed. While the braking lever 46 holds the bar 14, the trigger handle 24 is released. The spring 36 then returns the handle 24 and driving lever 32 to the positions shown in FIG. 4, ready for another stroke. At any time when the user desires to retract the movable jaw 12 away from the fixed jaw 22, for example, to release a workpiece or to open the bar clamp to receive a workpiece, it is only necessary to pull on the movable jaw 12 in the direction opposite to the arrow 44 while simultaneously compressing the spring 54 by pressing on the braking lever 46 in the direction of the arrow 44.

It should be noted that all operations of the trigger handle 24 and braking lever 46 can be accomplished with the same hand while holding the bar clamp 10 with that hand. Either the index or middle finger is in position to actuate the braking lever 46 as required while the other fingers encircle and contain the trigger handle 24 and handgrip 20.

Figure 2:
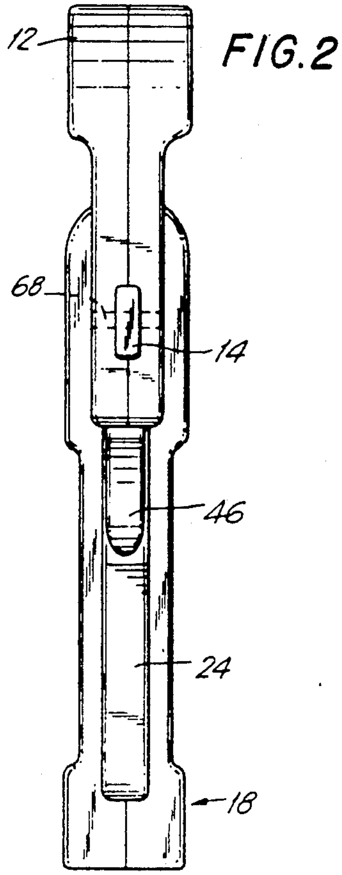
FIG. 2 is a left end view to an enlarged scale of the quick-action bar clamp of FIG. 1.
Figure 3:
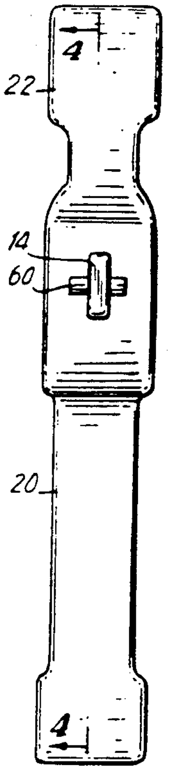
FIG. 3 is a right end view to an enlarged scale of the quick-action bar clamp of FIG. 1.

As best illustrated in FIGS. 2 and 3, the overall quick-action bar clamp 10 in accordance with the invention is basically flat, takes little space, and can be operated in tight places. Slide bars 14 of different lengths may be used.

In FIGS. 1-4, the handle/grip assembly 18 is formed of halves which are held together by screws 66 and the trigger handle 24 is solid and slips into the cavity 28 in the handgrip 20. In an alternative embodiment (FIGS. 5-7), a quick-action bar clamp 110 in accordance with the invention includes a one-piece handle/grip assembly 118, which includes no internal recess, and a basically U-shaped trigger handle 124. When the trigger handle 124 is squeezed against the handgrip 120, as will be apparent in FIG. 7, the handle 124 moves in the direction of the arrow 144 and straddles the handgrip 120. The end 150 of the braking lever 146 pivots in a recess 152 in the handle/grip assembly body 119. The trigger handle 124 pivots about an axis 126 and includes semicircular tabs 170 which are recessed into correspondingly shaped slots 172 in the body 119.

Operation of the bar clamp of FIGS. 5-7 is the same as that for the embodiment of FIGS. 1-4, taking note that the reference numerals in FIGS. 5-7 correspond with those numerals used in describing FIGS. 1-4, with addition of 100 thereto.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings, shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A method of operation of a clamp, said clamp comprising:

a slide bar, a movable jaw being mounted to said slide bar, and a fixed jaw opposing said movable jaw, support means for supporting said slide bar; said fixed jaw and a handgrip extending outwardly from said support means in opposite directions, said fixed jaw having at least a forward portion facing said movable jaw, receiving means situated at the junction between said forward portion of the fixed jaw and said support means, a braking lever pivotable at said receiving means and having an engaging portion extending outwardly from said support means, one-way drive means for releasably engaging and, when engaged, for advancing said slide bar and movable jaw, and a trigger handle pivotably mounted to said support means, said engaging portion of said braking lever is positioned forwardly of said trigger handle in the direction of the movable jaw, wherein said method comprises the following steps:

(a) positioning said clamp within one hand of a user so that said handgrip is received by a palm of said one hand;

(b) placing a workpiece between said fixed and movable jaws when said jaws are spread apart;

(c) advancing said movable jaw toward said fixed jaw by pressing and releasing said trigger handle by at least one finger of the hand thereby clamping said workpiece between said movable and fixed jaws; and (d) releasing said workpiece from said jaws by pressing said engaging portion of said braking lever by at least one finger of the hand other than a thumb;

whereby said braking lever and the trigger handle are selectively operable by the same hand in such a manner that said at least one finger is positioned on the engaging portion of the braking lever to actuate the braking lever, while the other fingers of the same hand encircle and contain the trigger handle and the handgrip.

2. The method of operation of a clamp as claimed in claim 1, wherein the step "c" comprises pressing and releasing said trigger handle by at least two fingers of the hand.

3. The method of operation of a clamp as claimed in claim 1, wherein the step "c" comprises pressing and releasing said trigger handle by at least three fingers of the hand.

4. The method of operation of a clamp as claimed in claim 1, wherein the step "d" comprises pressing said braking lever by at least two fingers of the hand other than the thumb.

5. The method of operation of a clamp as claimed in claim 1, wherein said clamp is a bar clamp.

6. The method of operation of a clamp as claimed in claim 1, the step "a" comprises supporting at least said handgrip by said thumb extending jaw.

7. The method of operation of a clamp as claimed in claim 1, wherein said one-way drive means has a driving lever, said braking lever normally engages said slide rod, said braking lever when engaging said slide bar prevents motion of said movable jaw away from said fixed jaw.

8. The method of operation of a clamp as claimed in claim 7, wherein said one-way drive means further includes a driving lever normally disengaged from said slide bar, said trigger handle is adapted to contact said driving lever upon pivoting of said trigger handle in a first direction from a standby position forcing said driving lever into engagement with said slide rod, said engaged driving lever moving said slide rod and said movable jaw toward said fixed jaw.

9. The method of operation of a clamp as claimed in claim 8, wherein said slide bar and movable jaw move together and being subject to reciprocal motion toward and away from said fixed jaw when said one-way drive means is disengaged by application of external forces to said braking lever, said slide bar being capable of moving said movable jaw in a continuous motion.

10. The method of operation of a clamp as claimed in claim 8, wherein said one-way drive means advances said moving jaw toward said fixed jaw in increments.

11. The method of operation of a clamp as claimed in claim 10, wherein said one-way drive means further includes bias means for normally urging said driving lever out of engagement with said slide bar and for returning said trigger handle in the direction opposite to the first driving direction.

* * * * *